United States Patent [19]

Tsuji et al.

[11] Patent Number: 4,611,980
[45] Date of Patent: Sep. 16, 1986

[54] FIBER REINFORCED THERMOSETTING RESIN CYLINDRICAL SHAPE PRODUCT MANUFACTURING APPARATUS

[75] Inventors: Shuya Tsuji; Yoshichika Kawabata; Rokuro Yamamoto, all of Osaka, Japan

[73] Assignees: Dai Nihon Ink Kagaku Kogyo Kabushiki Kaisha, Tokyo; Yamamoto Kogyo Kabushiki Kaisha, Okayama, both of Japan

[21] Appl. No.: 525,405

[22] Filed: Aug. 22, 1983

[30] Foreign Application Priority Data

Aug. 20, 1982 [JP] Japan .............................. 47-144337
Oct. 20, 1982 [JP] Japan .............................. 47-184083
Dec. 16, 1982 [JP] Japan .............................. 47-219269

[51] Int. Cl.4 ........................................... B29C 41/04
[52] U.S. Cl. .................................... 425/435; 264/310; 425/460
[58] Field of Search ...................... 264/45.7, 136, 137, 264/108, 310; 425/402, 435, 452, 460; 427/231; 118/105, 112, DIG. 10

[56] References Cited

U.S. PATENT DOCUMENTS 3,714,312 12/1973 Nitta et al. .......................... 264/310
3,885,521  5/1975 von Arx ............................. 118/112
4,097,572  6/1978 Walker .............................. 264/310
4,150,176  4/1979 Beckers ............................. 264/310
4,249,475  2/1981 Lindsey ............................. 118/112
4,278,411  7/1981 Anderson ........................... 425/435
4,398,492  8/1983 Casey ............................... 118/105

FOREIGN PATENT DOCUMENTS 51-47468  12/1976 Japan ................................ 264/310
53-117066 10/1978 Japan ................................ 264/108
54-36189  11/1979 Japan ................................ 264/108
37-7237    7/1973 U.S.S.R. ........................... 425/435

Primary Examiner—Jay H. Woo
Assistant Examiner—J. Fortenberry
Attorney, Agent, or Firm—Oblon, Fisher, Spivak, McClelland & Maier

[57] ABSTRACT

Disclosed is a fiber reinforced thermosetting resin cylindrical shaped product manufacturing apparatus and method using a cylindrical forming die body having open axial ends and rotatable about its longitudinal axis. A cantilever beam body is positionable within the die body so as to extend along the die body longitudinal axis. The cantilever beam supports a suspension stand which is either movable or fixed. The suspension stand includes a reinforcing fiber feeding apparatus, a liquid thermosetting resin feeding apparatus and freely rotatable pressing rollers. A resin hardening agent feeding apparatus can also be included. While the die body is slowly rotating about its longitudinal axis, fiber reinforcing material is fed onto the die body and resin, possibly including a hardening agent, is fed thereto. This mixture is then pressed by the freely rotating rollers as either the suspension stand or the die body itself is axially moved.

11 Claims, 15 Drawing Figures

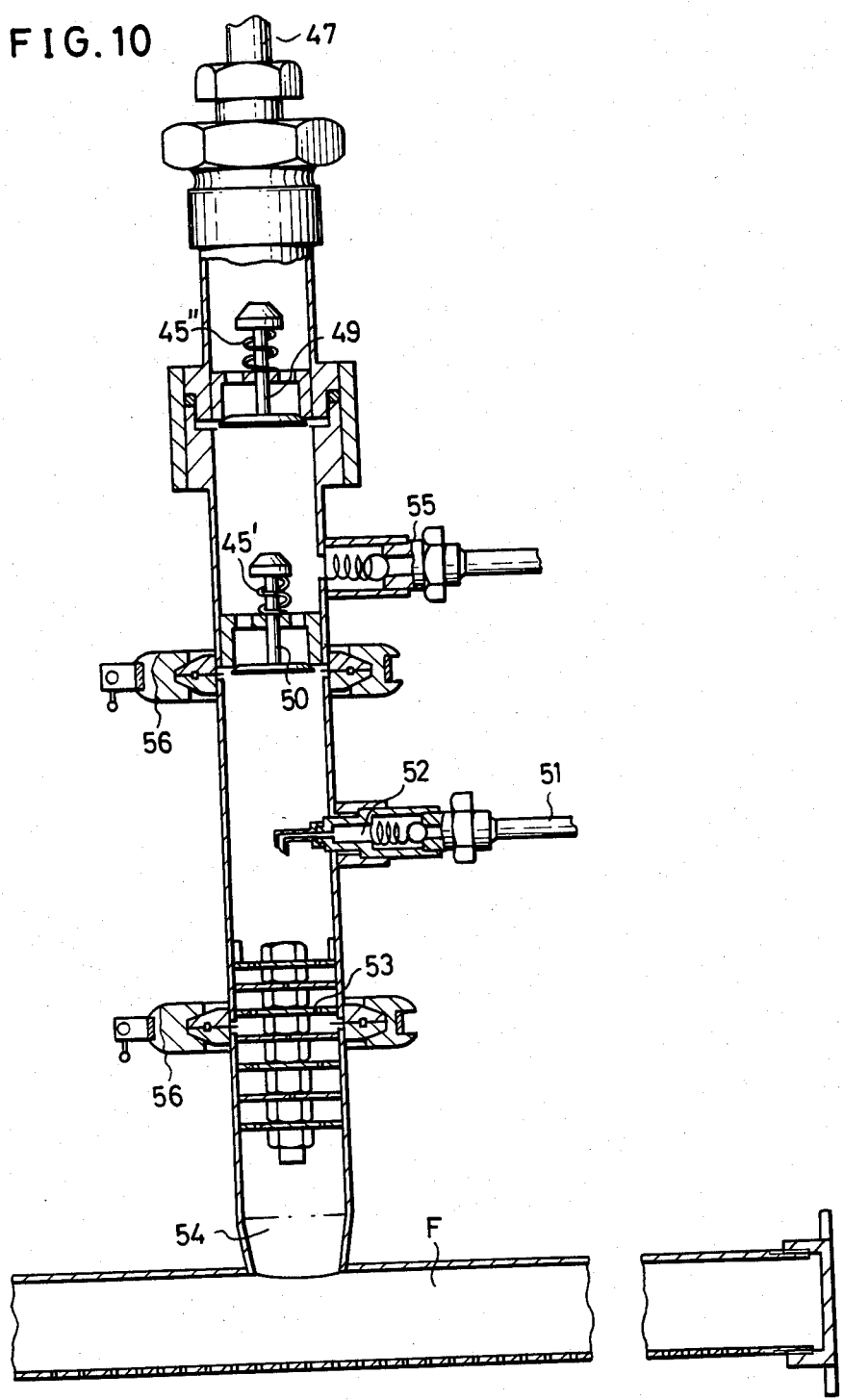

FIG. 13
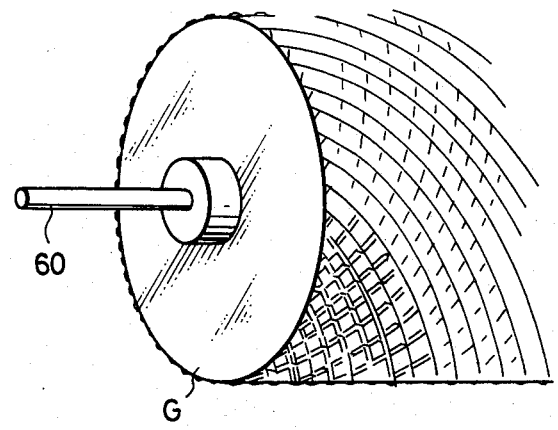
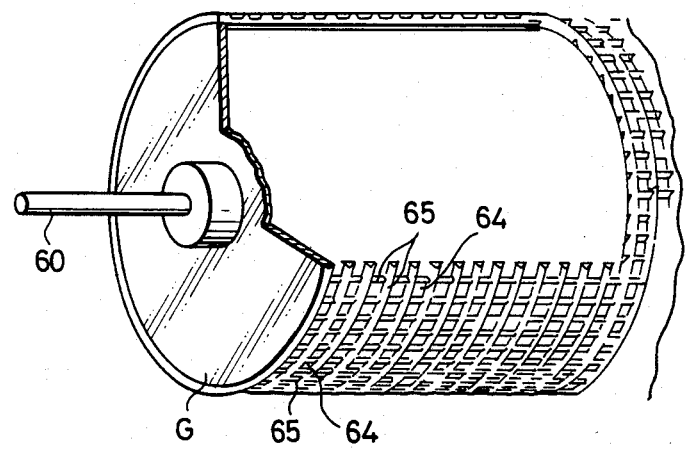

FIBER REINFORCED THERMOSETTING RESIN CYLINDRICAL SHAPE PRODUCT MANUFACTURING APPARATUS

BACKGROUND OF THE INVENTION

1. Field of the Invention

The instant invention relates to a fiber reinforced thermosetting resin (hereinafter is abbreviated as FRP) plastic cylindrical shape product manufacturing apparatus and method.

2. Description of the Prior Art

In the prior art of manufacturing FRP cylindrical shape products, the filament winding method which performs winding on the outside of a cylindrical form is known. However, this method has disadvantages in yield percentage, working environment, easy generation of voids, single directional property of fiber reinforcing material, etc.

Generally, the centrifugal formation method is also known. The centrifugal formation method is performed with a very high revolution speed to generate a centrifugal force of about 4 times gravity force, e.g. a revolution speed of 60 rpm or more in the case of forming a cylindrical body of the diameter of 2 m, to obtain uniform mixing of the reinforcing material and resin, and has the advantage that the formed cylindrical body has less voids, a constant external dimension and a beautiful appearance, as well as good yielding ratio and excellent working environment because of less scattering of raw materials. However, the centrifugal formation method has the disadvantage of requiring a large energy input for the high speed rotation, and also high precision and strength of the die are necessary. The fatal shortcoming of this method is the significant difference in the strength of the product in the axial and circumferential directions because the fiber reinforcing material being fed is arranged in the circumferential direction, generally resulting in a strength ratio of $\frac{1}{2}-\frac{1}{3}$, thus giving a very poor strength balance. Further, there remains the danger that the product is apt to be separated into two layers by the rotation and by the difference of specific weight between fiber reinforcing materials, mainly glass fiber, and liquid resin.

To overcome this disadvantage, Japanese Patent Laid Open Application No. 111577 of 1979 was proposed as a method of forming cylindrical shape products in which an FRP forming material supply part is installed so that it can be moved against the molding die which is rotated at the rate of 1-4 rpm (peripheral speed 5-10 m/min). Pressing rollers are installed parallel to the center line of the die and lowered from the center line of the die and the rotation of the cylindrical die and the rotation of the pressing roller are controlled with the same rotational speed by way of a chain wheel driven from the same driving part. An air cylinder is installed at the upper part of the pressing roller to move the roller vertically by air pressure so that the fed material is penetrated with pressure by the control of adding or releasing the roller pressure. This method allows formation with a smaller power source in comparison with the conventional centrifugal formation method, and in addition can form with a simpler die body without requiring high precision, and produces excellent cylindrical formed products with less directional variation of material strength.

However, this formation method requires that the forming be performed with perfect synchronization of the rotational speed of the die body and the pressing roller. However, rotation with perfect synchronization is very difficult in practice because the diameters of the die body and the pressing roller are different. Moreover, the internal diameters of the cylindrical formed products being formed becomes gradually smaller. Finally, even minor discordance of rotational speed may cause yield lump of fed materials or fine split. These problems are particularly apt to occur for internal diameters of 1.5-3 meters, with a circumferential speed of 10 m/min or more. In such case it is known to raise the air cylinder temporarily to avoid the lump, and then press the roller again. The repetition of pressing and releasing of roller in this way requires complicated operation control and reduces production efficiency; moreover, it makes it difficult to obtain uniform thickness.

Change in die body dimension by this method necessitates readjustment for the synchronization of rotational speed of the die body and the pressing roller each time. Further, the pressure of the roller must be adjusted for small variations of mixing rate of the fiber reinforcement material or variations of viscosity of thermosetting resin due to the effect of room temperature; however, changes of pressing conditions in accordance with above factors makes production control very difficult. Further, use of compressed air as the pressure source for the roller makes the mechanical structure complicated, and the cleaning after formation process becomes difficult because of the use of a chain wheel to synchronize the roller with the die. If the cleaning is neglected, the resin will harden and further manufacture will become impossible.

The inventors have endeavored to devise a method to form FRP cylindrical shapes products which allows them to be formed at a low rotational speed of e.g. 1-30 rpm (0.5-200 m/min of peripheral speed), with the removal of air bubbles contained in the forming materials, to give a constant strength ratio in axial/circumferential direction and uniform wall thickness for the product, this being done with a simple apparatus.

SUMMARY OF THE INVENTION

It is the object of the present invention to provide an improved method and apparatus for the manufacture of FRP cylindrical form shaped products.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 10 illustrates the liquid thermosetting resin feeding apparatus F;

FIG. 13 is a detail of two variations of the roller G surface characteristic.

DETAILED DESCRIPTION OF THE PREFERRED EMBODIMENTS

Figure 14:
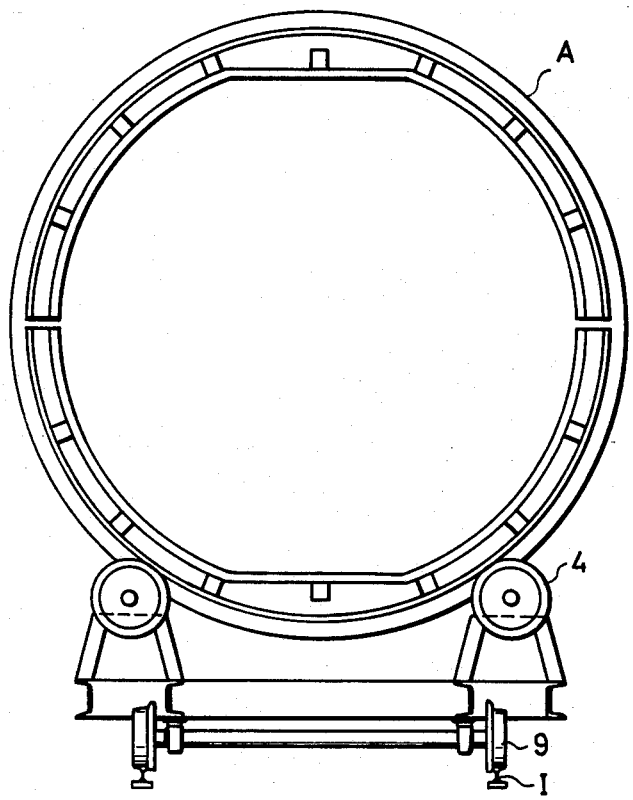
FIG. 14 is an end view of the cylindrical form die body A.

The cylindrical die body A is preferably made so as to be able to be separated at least into two pieces along a line parallel to its longitudinal axis, and to be closed by tie bolts 2 at the outside. The body A is usually formed with a section in the shape of a circle, oval or polygon, a circular section being shown in FIG. 14. The material of this die body may be metal, wood, plastic, stone, etc., with preference for metal. There is no special limitation to the size of this die, however generally it has an internal diameter of 1–4 meters, and is about 1–10 meters long, in consideration of the formation occurring inside of the die, and the need for transportation of the products. Any diameter and length other than above may, of course, be adopted.

Figure 1:
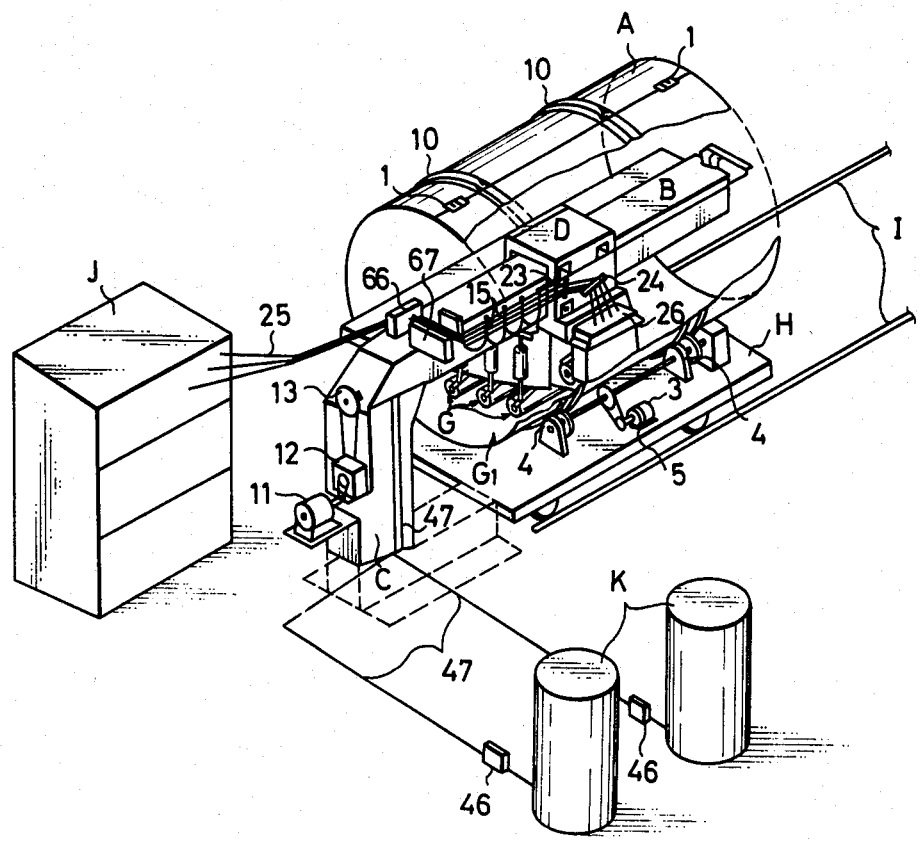
FIG. 1 is a perspective view of the overall apparatus in which the suspension head is movable.
Figure 2:
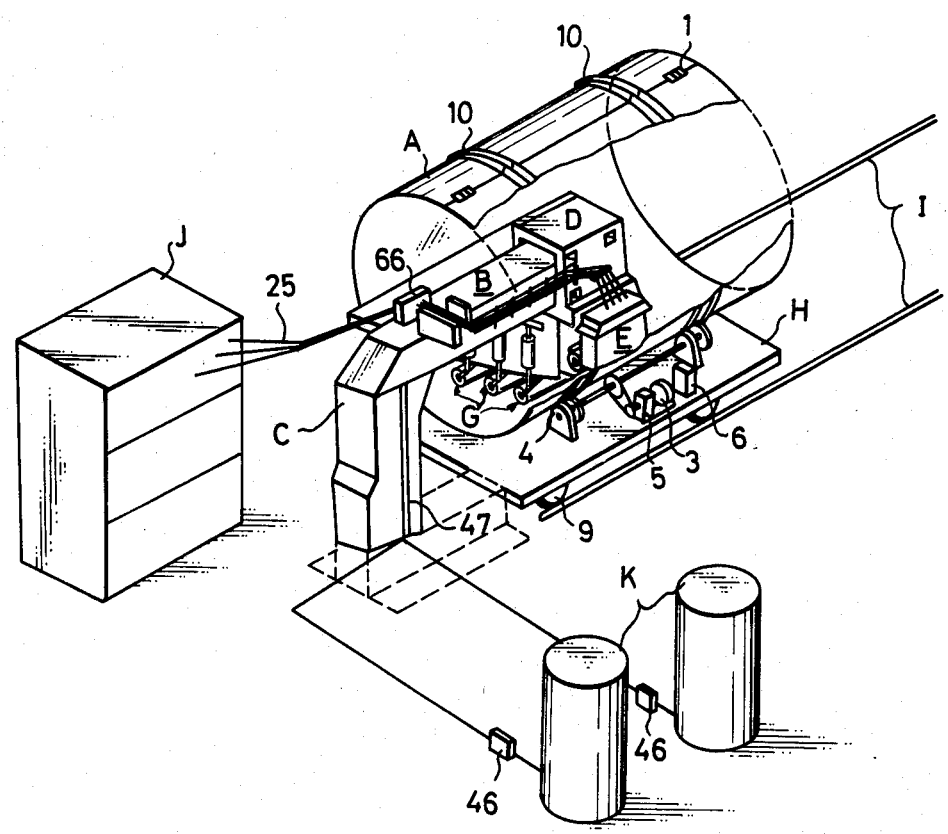
FIG. 2 is a perspective view of the overall apparatus in which the suspension head is fixed.

As shown in FIG. 1 and FIG. 2, the suspension stand D which is equipped with reinforcing fiber supply apparatus E, liquid thermosetting resin feeding apparatus F (refer to FIG. 6), pressing roller apparatus G, and the cantilever beam body B are accommodated in the die body.

FIG. 1 is a perspective view of a section of the cylindrical die body A of the apparatus in which suspension stand D moves along the cantilever beam body B. In this case, the cylindrical die body A is supported by at least four die body rotation rollers 4 which are supported on the truck H. These rollers are rotated by die body rotating motor 3 on the truck H, and contact the die body rotation roller partition plate 10, to give rotational motion to the die body. After product formation, the cylindrical die body A is pulled apart from the cantilever beam body B, by the movement of the truck H along the rails I. Removing the shaped products from the die body is performed by removing the tie bolts 2 (refer to FIG. 3), and opening the die body, using the hinged portion 1 as a fulcrum.

Figure 3:
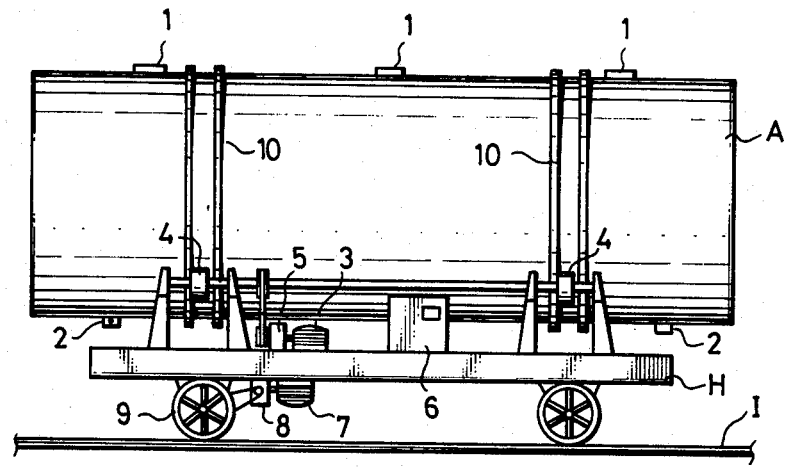
FIG. 3 is a front elevational view of the apparatus seen in FIGS. 1 and 2.

FIG. 2 is a partial sectional perspective view of the cylindrical die body A of the apparatus in which cylindrical die body A moves in its axial direction. In this case, the cylindrical die body A is moved by the truck H as the shaped products are being formed as shown in FIG. 3. During this movement, the truck H is driven by the truck wheel 9 whose rotational speed is controlled. The truck wheel 9 is rotated by the motor 7, which is controlled by the motor control board 6 on the truck H, via the reduction gear 8, and the rotation of the cylindrical die body A is performed as in FIG. 1.

Figure 4:
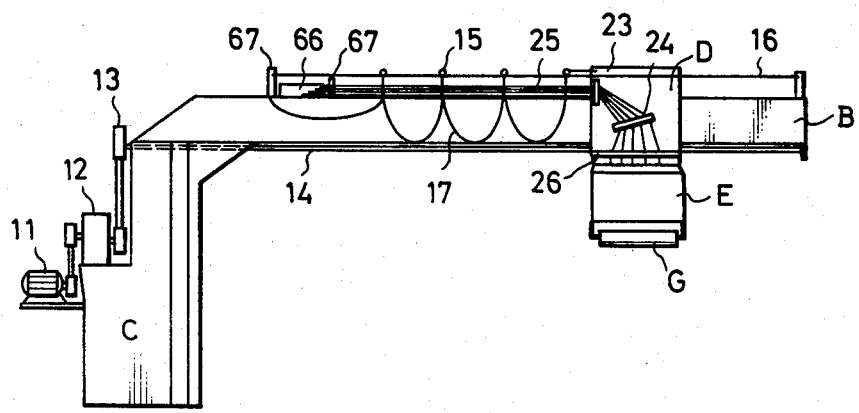
FIG. 4 shows the cantilever beam body and movable suspension stand of FIG. 1.

FIG. 4 is a side view of the cantilever beam body B. The cantilever beam body B includes suspension stand D, suspension stand driving shaft 14, reinforcing fiber supporting body 15, wire 16, chain 17 and reinforcing fiber feeding parts 66, 67. The suspension stand D is made to be able to reciprocate by the bi-directional rotation of the suspension stand driving shaft 14, which is supported by bearings on the back side of the beam body B, and the driving shaft is rotated by the motor 11 installed on the cantilever beam body base part C via a reduction gear box 12, a belt (not numbered) and a pulley 13.

Figure 5:
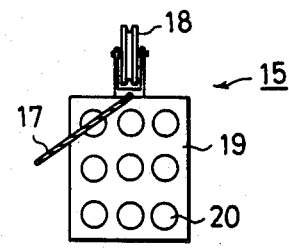
FIG. 5 shows the reinforcing fiber supporting body on the cantilever beam body.

The reinforcing fiber supporting body 15 is constructed, as shown in FIG. 5, by arranging a roller 18 on top of the plate 19 having reinforcing fiber through holes 20, and is mounted on the wire 16 stretched between the beam body B and each roller 18. Each supporting body 15 is connected to chain 17 which is arranged to have slackness so that the supporting bodies will not be separated by more than a certain distance, and each reinforcing fiber from the reinforcing fiber feeding parts 66, 67 is guided up to the suspension stand D through a hole 20 of each supporting body. The reinforcing fiber holes can instead have a spiral form.

On the other hand, in the embodiment by which suspension stand D does not move along the cantilever beam body B, as shown in FIG. 2, the motor 11, the reduction gear 12, the pulley 13, the suspension stand driving shaft 14, the wire 16 and the chain 17 are not required, and the reinforcing fiber supporting body 15 is attached by the cantilever beam body B. The cantilever beam body B, in this case, is fixed to the floor by the cantilever beam body base C.

In the embodiment by which suspension stand D moves along the cantilever beam body B, the suspension stand D is constituted as shown in FIG. 1 and FIG. 4, and in the embodiment in which the suspension stand is fixed to the cantilever beam body B, the stand D is constituted as shown in FIG. 2. The suspension stand D as shown in FIG. 1 and FIG. 4 is a so-called reciprocating travel body and the suspension stand D as shown in FIG. 2 is a so-called fixed suspension stand.

Figure 6:
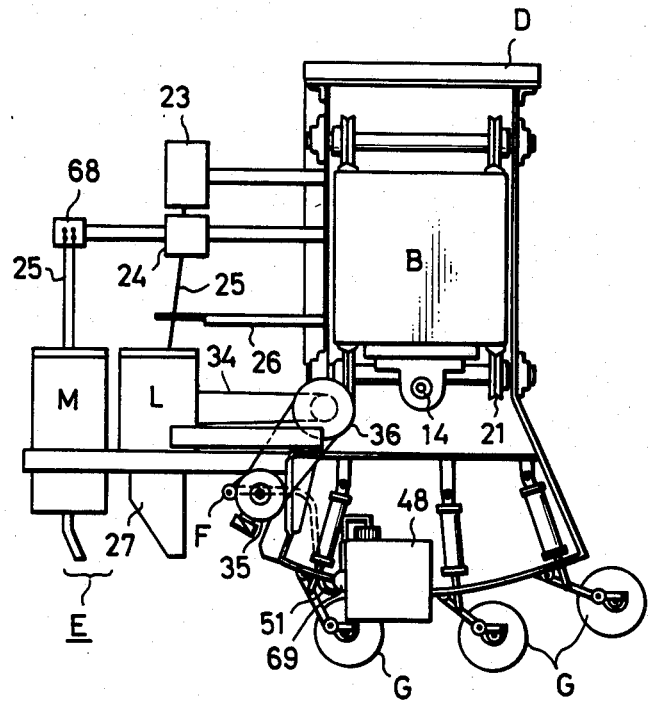
FIG. 6 is a side view of the suspension stand of FIG. 1, as seen from the side of the cantilever beam base part C opposite that of FIG. 1.
Figure 7:
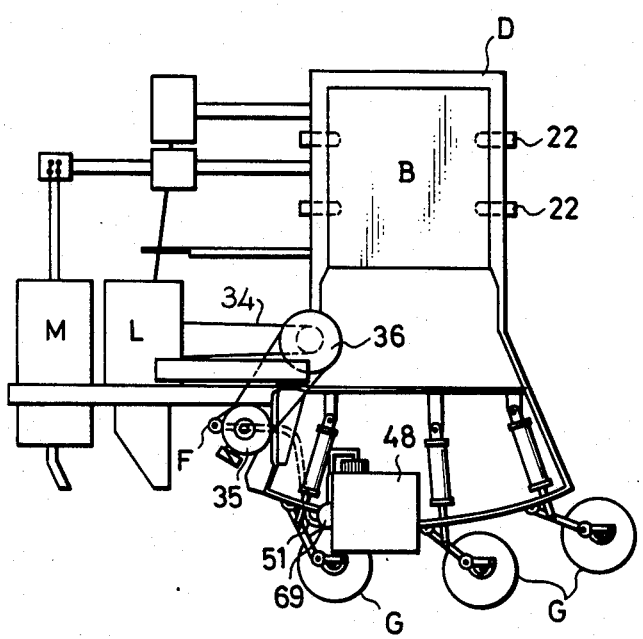
FIG. 7 is a side view of the suspension stand of FIG. 2, as seen from the side of the cantilever beam base part C opposite that of FIG. 2.

As is shown in the FIG. 6 and FIG. 7 which are respectively side views of the suspension stand D of FIGS. 1 and 2, to which strand feeding part M is attached, as seen from the side of the cantilever beam base part C opposite that of FIG. 1 and FIG. 2, the suspension stand D is installed with reinforcing fiber feeding apparatus E including a chopped strand feeding part L and a strand feeding part M, liquid thermosetting resin feeding apparatus F and the pressing rollers G. The suspension stand D in FIG. 6 is made to move along the cantilever beam body B by the rotational motion of the suspension stand driving shaft 14 transmitted to the wheel 21. On the other hand, in the case when the suspension stand D is fixed to the cantilever beam body B, the suspension stand D is fixed to the beam body with nuts 22, as shown in the FIG. 7 which is the side view of the suspension stand D, viewed from the side opposite that of the FIG. 2.

The apparatuses described above are installed on the suspension stand so that reinforcement fiber is first supplied from the reinforcing fiber supply apparatus E, then resin is applied upon it from the liquid thermosetting resin feeding apparatus F, after which the pressing rollers G of the pressing roller apparatus presses over them.

The apparatus E mainly consists of chopped strands feeding element L. However, strands feeding element M may also be included.

Figure 8:
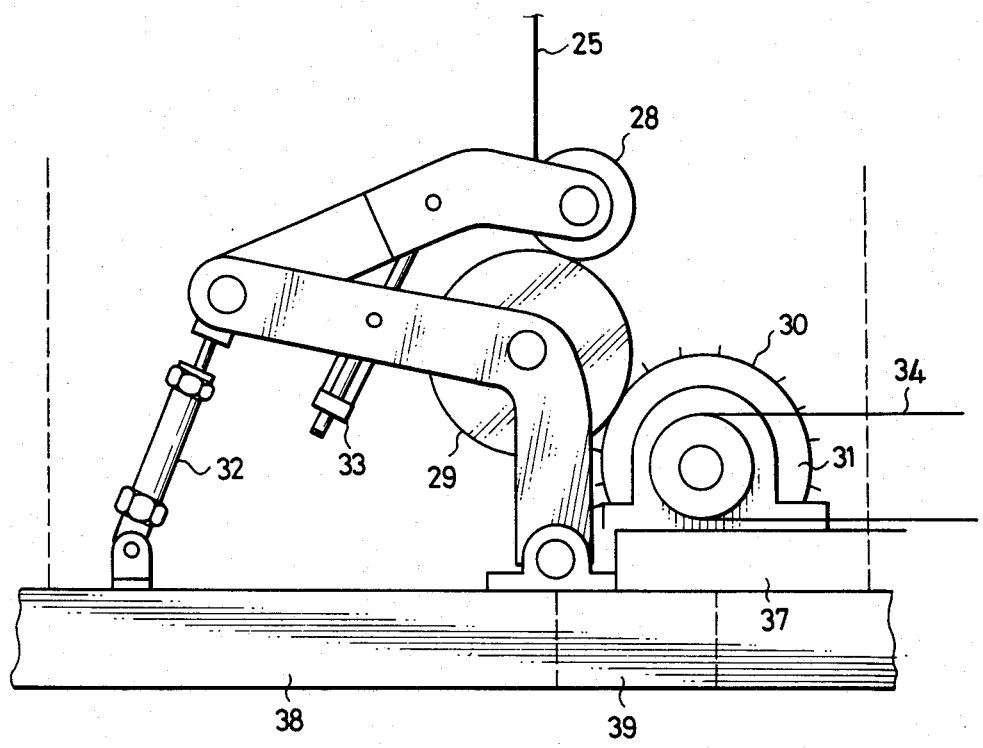
FIG. 8 illustrates the chopped strands feeding part.

In this apparatus, reinforcing fiber 25 is introduced through comb shaped guide 26. In this case, the reinforcement fiber 25 is bent about 45° to the vertical direction between the guide 24 and the guide 23. The reinforcing fiber 25 introduced into the chopped strand feeding part L is cut to short pieces, and is fed to the internal surface of the cylindrical die body A, through the shooter 27. The chopped strands feeding part is as shown in FIG. 8. It consists of rubber roller 28, contact rubber roller 29, and shearing blade roller 31 having shearing blades 30. The contact rubber roller 29 can be adjusted for a desired degree of contact with the shearing blade roller 31 by the air cylinder 32. Rubber roller 28 is pressed into contact with rubber roller 29 by the spring 33, and the degree of contact with the rubber roller 29 is adjustable. The shearing blade roller 31 is driven by the motor 35 via the variable speed gear box 36 and the belt 34, as shown in FIG. 6 or FIG. 7. The rate of feeding the chopped strands is adjusted by adjusting this rotation speed. Such rotation of the shearing roller 31 may also be made by any other method in addition to that described above. The shearing blade roller 31 and the contact rubber roller 29 may be located on the same suspension stand, or the former may be installed on a suspension stand 37 and the latter may be on the other suspension stand 38, as shown in FIG. 8. The reinforcement fiber 25 is advanced by the rubber roller 28 and the contact rubber roller 29, then is cut to short lengths by the shearing blade roller 31 and is fed to the inside face of the cylindrical die body A.

The chopped strand feeding part L can be any suitable device which is able to feed chopped strands evenly to the inside of the cylindrical die body A, and is able to control the quantity of feeding at an optional rate.

Figure 9:
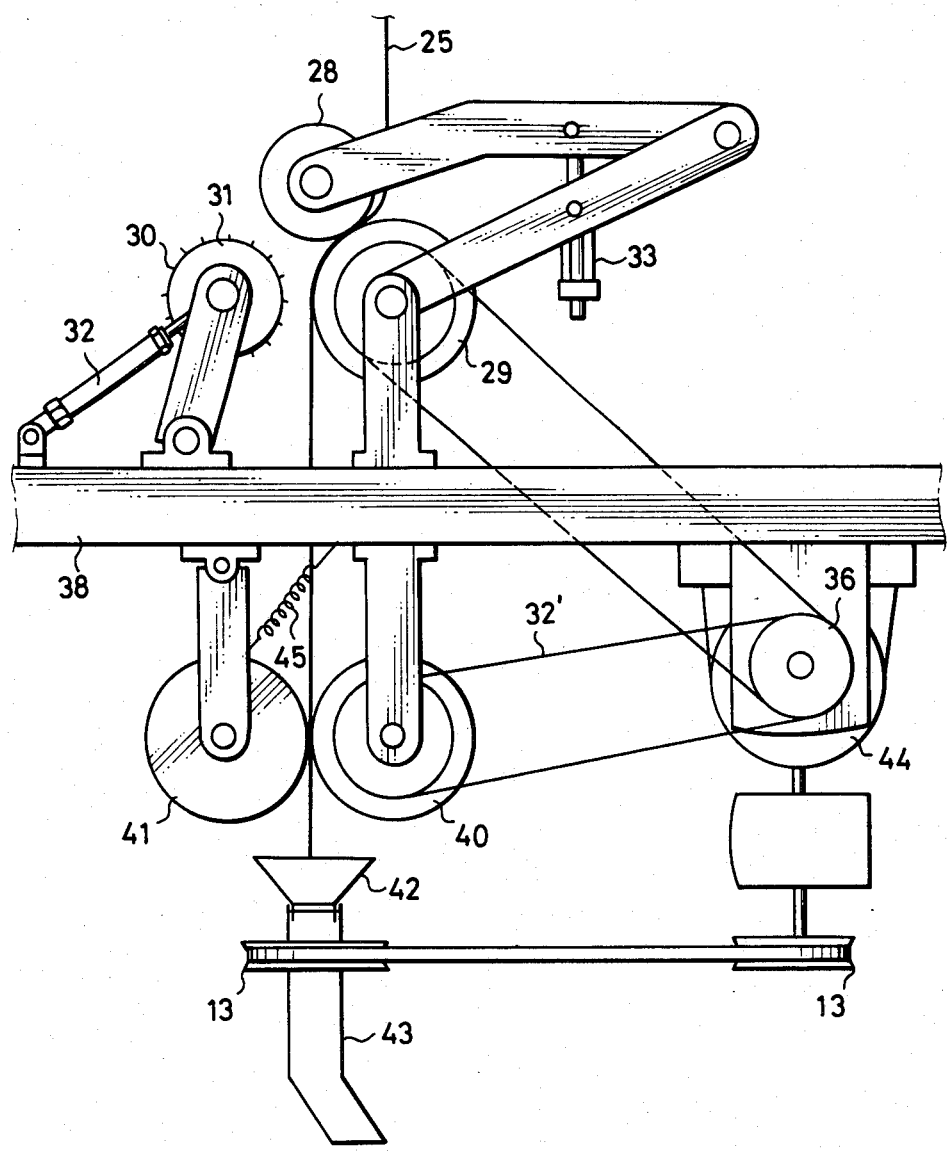
FIG. 9 illustrates the strand feeding part M.

On the other hand, the strand feeding part M is located at the front portion of the chopped strands feeding part L as necessary, and is constructed to direct the reinforcement fiber 25 to the receiving port 42 and dog-legged duct 43 by way of the rubber roller 28, contact rubber roller 29 and secondary stage rubber rollers 40, 41, as shown in FIG. 9. This feeding part is provided with shearing blade roller 31 connected with the air cylinder 32, for cutting the reinforcement fiber 25 when formation is finished. The shearing blade roller 31 is positioned so that when the air cylinder 32 is operated, roller 31 contacts the rubber roller 29 to cut the reinforcing fiber 25, but otherwise does not contact the rubber roller 29. The contact rubber roller 29 and the second stage rubber roller 40 in FIG. 9 are rotated by the motor 44, and the second rubber roller 41 is pulled by the spring 45 which is fixed to the suspension stand 38 so that it will contact the second stage rubber roller 40. The dog-legged duct tube 43 is positioned at the lower part of the second rubber rollers 40 and 41, which can change direction freely, being driven by the motor 36 through the belt 32'.

The feeding quantity of the reinforcement strands is controlled by changing the rate of rotation of contact rubber roller 29 and the secondary stage rubber roller 40, and the number of the strands.

As the reinforcement fiber 25 to be applied, known reinforcement fibers such as glass fiber, carbon fiber, alamide fiber (e.g. KEvLAR-fiber by DuPont) etc., can be considered, and specially the glass fiber is preferable.

The quantity of fiber to be fed by this invention is generally 10–80% by weight of the product; 15–60% by weight is preferable, and more preferable is 20–50% by weight.

The liquid thermosetting resin feeding apparatus F (refer to FIG. 6) dispenses thermosetting resin from liquid thermosetting resin tank K, shown in FIG. 1 and FIG. 2, via metering pump 46 and resin pipe 47. The apparatus F has almost the same width as that of the reinforcing fiber feeding port of the reinforcement fiber supply apparatus E. Apparatus F has a number of liquid thermosetting resin dispensing holes of 0.1–3 mm dia. which are formed so that adequate resin can be supplied on the reinforcing fiber.

The hardening agent of the liquid thermosetting resin is fed to the feeding apparatus F from the hardening agent tank 48 shown in FIG. 7, via the metering pump 69 and the pipe 51. As for the metering pump 69, a gear type pump is used. And the pump is adjusted so that the ratio of resin and hardening agent will be 100:0.5–5 (weight ratio).

As shown in detail in FIG. 10, feeding apparatus F is constructed such that the liquid thermosetting resin sent by the resin pipe 47 flows through the main check valve 49 and the auxiliary check valve 50 and is mixed with the hardening agent delivered through hardening agent pipe 51 and hardening agent flow-in port 52 in the in line mixer 53, and flows out from the liquid thermosetting resin flow-out port 54. In the example shown in FIG. 10, air or solvent is introduced from the air and solvent flow-in port 55, to serve for the stopping of resin feeding and cleaning of the line. At that time the auxiliary check valve 50 is open with its spring 45' being pushed down, and the main check valve 49 is closed with its spring 45'' pressed up. The pipe having the hardening agent flow-in port 52 for the liquid thermosetting resin is preferably made to be partly removable by upper and lower flange clips 56 for ease of cleaning, and can be disassembled if necessary. As for the in line mixer 53, positively driven type mixers may also be used. The compressed air for the solvent flow-in port 55 is delivered from an air-compressor through a pressure resisting flexible hose. Solvent is used to clean the liquid thermosetting resin feeding apparatus F, and if necessary the interior surface of the cylindrical die body A, and is delivered from the solvent tank by a pump through a solvent resisting flexible hose to the flow-in port 55. These flexible hoses, etc., may be used as the flexible hose, etc., for feeding liquid thermosetting resin. In case of the above cleaning, solvent only may serve the purpose.

In the case where the suspension stand D moves along the cantilever beam body B as shown in FIG. 1, liquid thermosetting resin normally flows from the resin tank K through the resin pipe 47, through the then flexible hose into the liquid thermosetting resin feeding apparatus F. The flexible hose in this case is made to have sufficient length to accommodate this movement (e.g. it is coiled to a suspension rod parallel to the cantilever beam body B). The location of the hose is preferably at the side of the cantilever beam body B at the opposite side of the reinforcing fiber 25 in FIG. 4.

As for the liquid thermosetting resin to be used for implementation of this invention, a known resin such as polyester resin, epoxy resin, phenolic resin, vinyl ester resin, etc., can be used and unsaturated polyester resin is preferable. In case this unsaturated polyester resin is used, it is preferable to use peroxide, etc., as the hardening agent, and to use an organic salt, amine, etc., as a hardening accelerator. Such hardening agent and hardening accelerator may be fed to the reinforcement fiber inside surface of the die separately from the resin, or premixed with the resin. The hardening accelerator is normally put in the liquid thermosetting resin tank K.

The liquid thermosetting resin may be premixed with pigment, filler, etc.

Figure 11A:
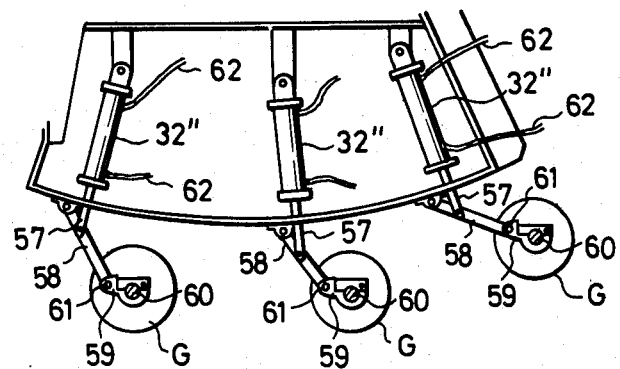
FIG. 11A shows the depressing roller support structure.
Figure 11B:
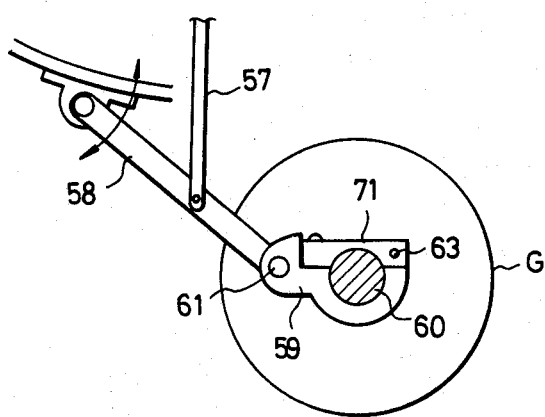
FIG. 11B is a detail of the pressing rollers G.

As is shown in FIG. 11(A) and (B), the lower end of the piston rod 57 of the pressing roller apparatus is pivotally joined to the rocking lever 58. The journal part of each pressing roller G is secured to the free end of the rocking lever 58 by pivotally supporting the bearing body 59 with the pin 61. Therefore, the pressure of the air pipe 62 pushes down the piston rod 57 of the air cylinder 32'', and the bearing body 59 rotates around the pin 61 even when the pressure is transferred to the rocking lever 58, and the pressure is not transferred to the pressing rollers G. Therefore, the pressing rollers G press the internal surface of the cylindrical die body A with their own weights without any relation to the pressure of the air cylinder 32'' when they press the internal surface of the die body A.

The air cylinders 32'' are used to pull up the pressing rollers G from the internal surface of the cylindrical die body A. The pressing rollers G can pivot freely within a limited angle in a vertical direction with the pin 61 as the center. Therefore when the pressing rollers G freely press the forming material, their heights will change with the resistance of the formation material, etc., even though their rotation about their own axes 60 is harmonized with the rotation of the die body i.e., they rotate freely and are not positively driven.

These rollers G are positioned in the lower portion of the suspension body D, and downstream from reinforcement fiber supply apparatus E and liquid thermosetting resin feeding apparatus F. The pressing rollers G are preferably made so as to be removed from the bearing body 59 by opening the opening/closing part 71 which is pivotally joined to the bearing body 59 by way of the pin 63.

In this invention, a small variation of the load within a limited range will not disturb the free rotation of the pressing rollers G. However, when the load becomes too large, or the roller's own weight becomes larger, the rollers sink into the forming material causing resin to be squeezed out, resulting in an undesirable condition of low resin content shaped products. On the other hand, when the weight of the pressing rollers G is too small, impregnation of resin becomes insufficient, air bubbles remain in the forming material, and the material falls from the surface of the die when that portion of the cylindrical die body A is turned to the upper position, and product formation becomes impossible. Therefore the pressure rollers to be used in this invention are normally of a length of 10–100 cm, and preferably 30–70 cm, and their weight shall be such as to cause the load or pressure acting on the forming material to be 20 g–600 g, preferably 50–400 g, and more preferably 80–300 g, per units length (cm) of a roller. To attain efficient impregnation of resin and elimination of air bubbles by such rollers, 3 or more rollers are preferably positioned at proper intervals in this invention.

The length of the rollers G is as explained above. However, it can be changed in accordance with the length of the forming shape, and their diameter can be of any size smaller than the internal diameter of the die body; the dimension shall allow free rotation of the rollers, in the die body, and usually 5–40 cm is suitable. Further the pressing rollers G are preferably to have dimples to their surface, for example such as having concave portions 64 and convex portions 65 as shown in FIG. 13. The concave part of the rollers G may be channels of straight form, spiral form, crossed form, etc., however preferably they are not continuous channels. The concave parts are made with a width of 1–30 mm, preferably 2–10 mm in the direction of the generating line, and 1–30 mm, preferably 2–30 mm, width in the circumferential direction, with a depth of 1 mm or more, and such uneven parts cover 30–90%, preferably 50–80% of the roller area. The above concave parts do not form a continuous channel in the direction of the roller generating line and circumferential direction and may be the same or different width within the above range. Their configuration may be triangular, square, pentagonal, polygonal, circular, oval, cross, X-type or other forms.

These forms are formed by machining of the roller surface at the time of roller manufacturing, winding of a metal sheet having dimpled surface formed by press work or plastic sheet on the roller surface, winding of metallic or plastic net on the roller surface, winding of a perforated tube on the surface of the roller, or other proper means. Moreover, in consideration of ease of manufacturing of the pressing rollers G, low cost, and ease of repair, rollers wound with at least one thermoplastic sheet of a net of 0.5–5 mm, with mesh of 2–8 mm, for example polyethylene, polyester, polyamide, etc., or metal is preferable.

The material of the pressing rollers G to be used by this invention may be of any material which can withstand the pressure, e.g., known materials such as iron, aluminum, stainless steel, copper, wood, plastics, etc., or a combination of any of those materials. Further, the roller can be hollow as well as solid.

The apparatus for feeding liquid thermosetting resin varies in structure as a function of the type of liquid thermosetting resin used. For example, in the case of unsaturated polyester resin, hardening agent tank 48 and hardening agent pipe 51 are formed, as shown in FIG. 6. In this case, the hardening agent pipe 51 is connected to the lower side of the liquid thermosetting resin feeding apparatus F, as shown in FIG. 10. Such hardening agent tank may be installed outside of the cylindrical die body A, instead of attaching it to suspension stand D.

In this case, the hardening agent pipe is a flexible pipe which can be expanded and contracted along the cantilever beam body B when the suspension stand D moves along the beam body.

On the other hand, when the liquid thermosetting resin is epoxy resin, the hardening agent may first be added into the resin. Therefore, the hardening agent tank and the hardening agent pipe are not necessarily required.

Figure 12:
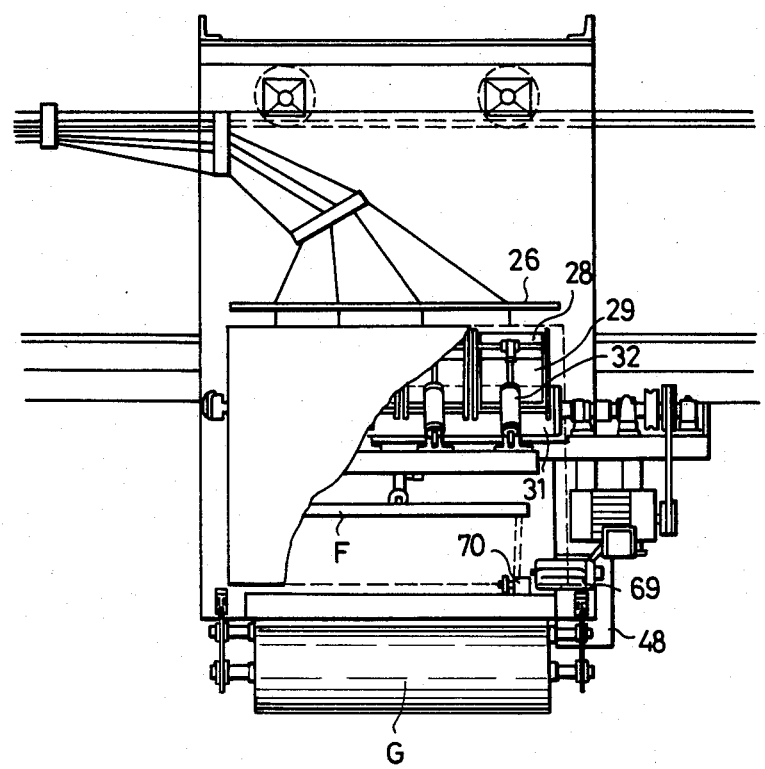
FIG. 12 is an end view of the suspension stand mounted on the cantilever beam body.

Moreover, a certain quantity of hardening agent is fed into the liquid thermosetting resin feeding apparatus F by way of hardening agent metering pump 69 and controller 70, as shown in FIG. 12.

Now detailed explanation will be given for the manufacturing of a formed shape using above-described apparatuses.

From the reinforcing fiber storage part J shown in FIG. 1, normally roving condition reinforcing fiber 25 is taken out. In this case, e.g. 32 reinforcing fibers 25 are taken out, and are grouped into 4 bundles of 8 threads each at the reinforcing fiber feeding part 66 and fed into the reinforcing fiber supply apparatus E through the guide 67, reinforcing fiber supporting body 15, guide 23, guide 24 and comb-shape guide 26. Then the reinforcing fibers 25 are sheared by shearing blades 30 formed with a certain spacing on the shearing blade roller 31 at the chopped strands feeding part L, as shown in FIG. 6, and normally are made into chopped strands of 25-100 mm long and are fed to the inner surface of the die body through the shooter 27. The rate of feeding is controlled by the rotational speed of the shearing blade roller 31, and the proper value is normally at 1-15 kg/min.

On the other hand, the reinforcing fiber 25 may also be fed as a continuous strand, in this case, a part of the reinforcing fiber 25 is introduced into the strands feeding part M through the guide 24 and the guide for strands 68.

Quantity of feeding such reinforcement fiber 25 to the inside surface of the die body A is adjusted at the feeding part M by the rotational speed of the contact rubber roller 29 and the secondary stage rubber roller 40. The proper quantity is 1-15 kg/min.

Either the chopped strands or strands may be fed, or the both may be fed simultaneously. Or the fiber can be fed so as to form a chopped strands FRP layer at first, then a continuous strand FRP layer.

While the reinforcing fibers 25 are fed as described above, liquid thermosetting resin including hardening accelerator is fed from liquid thermosetting resin tank K, through resin pipe and liquid thermosetting resin feeding apparatus F onto the fiber. The quantity of feeding of such resin is normally controlled by the metering pump 46, and is normally determined to make the reinforcing fiber contents of 15-70% of the product by weight. The hardening agent is fed from the hardening agent tank 48, through hardening agent pipe 51, into the liquid thermosetting resin feeding apparatus F, and is then mixed with the resin. The feeding quantity of such hardening agent is controlled by the hardening agent metering pump 69 and controller 70, so that to make it 0.3-5 weight part against 100 weight part of the resin, in the case of unsaturated polyester resin.

Then the pressing rollers G press on the reinforcement fiber and resin. In this case, the speed of the pressing rollers is the same as the rotational speed of the cylindrical die body A, which is determined by the weight of the roller, viscosity of the liquid thermosetting resin, etc.

The viscosity of the liquid thermosetting resin is important from the viewpoint of impregnation of the reinforcement fiber, and dripping etc. Too low a viscosity is apt to cause blanching or dripping whereas too high a viscosity causes poor impregnation resulting in the forming material not adhering to the die surface and falling off in spite of being pressed by the roller so that product formation is impossible. From these points of view, viscosity of the resin is normally selected in the range of 0.5-20 poise/25° C. (Brookfield viscosity), preferably 1.0-15 poise/25° C., more preferably in the range of 2-10 poise/25° C.

The rotational speed of the cylindrical die body A is selected so as to cause a centrifugal force of less than 2 times the gravitational force, preferably less than 1.2 times of gravity, and more preferably to cause a centrifugal force of less than the gravitational force.

Generally, centrifugal force of a rotational body at its wall surface is obtained by:

$$F = m\gamma\omega^2.$$

Where, F is centrifugal force, m is the unit mass, $\gamma$ is internal radius of the rotational body, and $\omega$ is the angular velocity. For example, the centrifugal force of the forming body acting on 1 cm$^3$ unit, when a 2 m internal radius cylindrical die is rotated at the speed of 60 rpm for the formation of a FRP cylindrical shape, is obtained as 7.24 g.cm/s$^2$, assuming a specific gravity of the forming material of about 1.8. From the fact that gravity can be calculated by: $F = m\alpha$ ($\alpha$ is the acceleration), F reduces to 1.8 g.cm/s$^2$, i.e. about 4 times gravity. In this case, a centrifugal force of 2 times gravity is provided by 30 rpm, i.e. a peripheral velocity of 266 m/min. According to the results of experiments performed by the inventors, in general a conventional centrifugal formation using centrifugal force exceeding 2 times the gravitational force, preferably 4 times, or more, centrifugal force is required to keep the forming body being fed, from falling off from the die body. When the centrifugal force is less than this value it becomes difficult to keep the forming material pressed to the wall body.

From the above explanation, although it is not exact because the rotation speed of the die body of this invention changes with the internal diameter, rotational speed should be 1-30 rpm, preferably 1-15 rpm, with a peripheral speed of 0.5-200 m/min preferably 0.5-100 m/min in the case of a die body of a diameter of 2 m. Incidentally, the above peripheral speed changes in relation with the diameter of the die body.

When the suspension stand D moves along the cantilever beam body B as shown in FIG. 1, the speed of the movement of the suspension stand is determined by the feeding rate of the reinforcement fiber and resin, and the proper speed is normally at or about 51-50 cm/min. On the other hand, in the case of a cylindrical die body moving in the direction of its axial line as the molded shape is being formed as shown in FIG. 2, the proper speed is about 5-150 cm/min. In both cases the suspension stand or die body will not be moved during the formation of the ends of the shaped products.

This invention may be so implemented that an FRP layer is first formed, then a foamed layer of rigid polyurethane or polyester is formed upon it, and further an FRP layer is formed upon them by the apparatus of this invention to make a cylindrical shaped body of triple layer structure. The foaming resin to be used for this process may be mixed with various types of inorganic filler materials, miniature porous cubic bodies, reinforcement fibers, etc. The magnification rate of such foaming layer may suitably be selected, however, generally they are 1.5-60 times, and preferably 1.5-40. When the thickness of the foamed layer is not even, the layer should be machined by a cutter, etc., to an even thickness. No limitation exists for the thickness of the foamed layer so long as it is in the range allowing one to shape the FRP layer by the apparatus of this invention, and the proper value is normally 0.2-10 cm. The foamed layer may be provided with various ribs for reinforcement.

The resin to shape the above foamed layer is normally fed from a tank installed outside of the cylindrical die body A by way of a transfer pump, etc., through a hose to the gun attached to the suspension stand D, and is supplied from there.

As for the method to supply this foaming resin, a falling system applying only gravity, foaming-in place by preparing space for the formation of foamed layer, or any other suitable method other than the above spray method may be used.

As for the blowing agent used for the expandable resin, generally known agents may be used, for example a hydrazide compound, an isocyanate compound, an azo compound, calcium carbonate-acid constitution, etc. for unsaturated polyester resin, and an isocyanate compound, Freon, etc., for polyurethane resin.

The cantilever beam body B and its base part C to be used for this invention should be made as a strong structure because the suspension stand D is heavy. However, the length of the cantilever beam body B can be reduced to half of the length to be shaped in the cylindrical die body A, by first forming up to half of the length of the cylindrical die body A in the direction of its axis, then rotating the truck H for 180° and forming the balance of the shape by inserting the suspension body D into the unfinished part of the cylindrical die body A. In this case, the rotational direction of the die body shall be reversed.

The cylindrical form shape thus formed is then taken out by removing setting bolts 2 of the cylindrical die body A. Although there is no specific limitation for the thickness of the FRP layer of the formed shape as far as it is in the range to be formed by the above apparatus, normally the range of 0.2–10 cm is proper.

The cylindrically formed shape obtained by application of this invention is superior in strength because it has less thickness variation for the resin impregnation, and the reinforcement material is dispersed evenly, and is suitable for use as the cylindrical vessel in tanks, cleaning tanks, silos, etc.

EXAMPLE OF APPLICATION 1

An FRP cylindrical shape was obtained by using a die body of internal diameter 2 m, and 6 m long in the manufacturing apparatus of FIG. 1.

Glass roving SP-3 (manufactured by Asahi Fiber Glass Ltd.) was cut to a length of 50 mm and was fed to the surface of an iron die rotating at the speed of 6 rpm (peripheral speed, 37.7 m/min) at the rate of 4.5 kg/min. Then liquid unsaturated polyester resin (POLYLITE FG-104, manufactured by Dainippon Ink & Chemicals Inc.) at the viscosity of 6 poise/25° C., premixed with 4% by weight of 6 weight % cobalt naphthenate (manufactured by Dainippon Ink & Chemicals Inc.) as hardening accelerator, and 55 weight % MEKPO (manufactured by Nippon Oils & Fats Co., Ltd.) as hardening agent were mixed in the line mixer at the weight ratio of 100:1.5, and fed on the glass fiber at the rate of 10 kg/min.

This mixture was pressed by pressing rollers each of which was a plain steel roller 50 cm long, 15 cm in diameter, and weighed 8 kg, doubly wound with a polypropylene net of 2 mm dia. and 5×5 mm mesh on its surface.

Three sets of rollers were used at a spacing of about 10 cm, and the pressure of the each roller due to its own weight was about 230 g/cm.

The suspension stand D on which a feeding part of glass fiber, resin, etc., and pressing rollers are mounted was moved along the axis of the rotation of the die at a speed of 30 cm/min.

A cylindrical shape of 6 m long, 2 m diameter, and 8 mm thickness was obtained. Test pieces in the longitudinal and circumferential directions were cut out from the shape, and their strength was measured. The results are shown in Table 1. Porosity of the products was also measured and is shown in Table 2.

EXAMPLE OF COMPARISON 1

A product of FRP cylindrical shape 8 mm thick and 4 m long was obtained by using a centrifugal forming machine (manufactured by Haltman Co., Model v-18-25100) having a rotational die of 2 m internal diameter, and 4 m long, and formed at a die speed of 90 rpm with die peripheral speed of 565.2 m/min, using the same liquid resin and glass fiber as in application 1 and adopting the feeding rates of 22 kg/min and 9.8 kg/min. The products were compared to those of example of application 1, and the results are shown in Table 1.

EXAMPLE OF COMPARISON 2

An FRP cylindrical shaped product was obtained using the apparatus of the example of application 1, modified to rotate the pressing rollers driven harmonizingly with the die body by a chain drive, and pressed with air cylinders.

Conditions such as rotational speed of the die, types of the liquid resin and glass fiber and quantity of supply, etc., were selected as in the case of example of application 1, however, formation materials frequently became lumped at the pressure roller part during the formation, and the rollers were frequently obliged to move apart from the forming materials. This resulted in very bad efficiency, and took much time to obtain the product similar to the example of application 1. Properties of formed shapes are indicated in the Table 1. The porosity of the shaped product was measured and is shown in Table 2.

TABLE 1

| | Example of Application 1 | | | | Example of Comparison 1 | | | | Ex. of Comp. 2 | |
|---|---|---|---|---|---|---|---|---|---|---|
| | I | | O | | I | | O | | I | |
| | Direction of Loading | | | | | | | | | |
| Sample Taken From | Axial Direction | Circular Direction | Axial Direction | Circular Direction | Axial Direction | Circular Direction | Axial Direction | Circular Direction | Axial Direction | Circular Direction |
| Tensile strength (kg/mm$^2$) | 9.7 | 9.4 | — | — | 3.5 | 11.6 | — | — | 8.2 | 7.5 |
| Ten. Ela. Modu. (kg/mm$^2$) | 920 | 870 | — | — | 538 | 995 | — | — | 810 | 780 |
| Bending strength (kg/mm$^2$) | 21.2 | 18.4 | 19.6 | 18.1 | 5.2 | 12.6 | 7.4 | 24.2 | 18.4 | 15.6 |
| Ben. Ela. Modu. (kg/mm$^2$) | 750 | 730 | 730 | 716 | 484 | 751 | 470 | 795 | 680 | 690 |

TABLE 1-continued

| Sample Taken From | Example of Application 1 | | | | Example of Comparison 1 | | | | Ex. of Comp. 2 | |
|---|---|---|---|---|---|---|---|---|---|---|
| | I | | O | | I | | O | | I | |
| | Direction of Loading | | | | | | | | | |
| | Axial Direction | Circular Direction | Axial Direction | Circular Direction | Axial Direction | Circular Direction | Axial Direction | Circular Direction | Axial Direction | Circular Direction |
| Glass contents (%) | 29–32 | 28–31 | 29–31 | 28.5–32 | 29.5–32.4 | 29.7–31.8 | 28.7–32.8 | 29.6–33.1 | 31.0 | 31.0 |

(Note)
Tensile strength and tensile elastic modulus: Measured in accordance with JIS K-7113.
Bending strength and bending elastic modulus: Measured in accordance with JIS K-7203.
Glass contents: Measured in accordance with JIS K-6919.
Direction of loading:
I — Loaded to the inside surface of the specimen cut from the cylindrical formed shape.
O — Loaded to the outside surface of the above specimen.

TABLE 2

| Example Test Piece No. | Example of Application 1 | | | Example of Comparison 2 | | |
|---|---|---|---|---|---|---|
| | Row of Test Piece | | | | | |
| | A-row | B-row | C-row | A'-row | B'-row | C'-row |
| Porosity (%) | | | | | | |
| 1 | 0.5 | 0.7 | 0.8 | 2.9 | 3.1 | 2.7 |
| 2 | 0.4 | 0.5 | 0.6 | 3.2 | 2.8 | 2.9 |
| 3 | 0.6 | 0.6 | 0.5 | 2.6 | 2.6 | 3.2 |
| 4 | 0.8 | 0.6 | 0.7 | 2.8 | 2.8 | 2.7 |
| 5 | 0.6 | 0.7 | 0.8 | 2.8 | 2.9 | 2.5 |
| Glass Contents (%) | | | | | | |
| 1 | 29.7 | 30.2 | 32.1 | 26.7 | 32.3 | 35.8 |
| 2 | 32.4 | 28.7 | 29.6 | 35.1 | 29.8 | 27.2 |
| 3 | 31.6 | 29.8 | 31.4 | 28.1 | 36.2 | 28.3 |
| 4 | 29.5 | 32.2 | 29.3 | 34.5 | 25.3 | 26.2 |
| 5 | 31.5 | 31.5 | 28.2 | 32.1 | 26.2 | 32.7 |

(Note)
Test line: To take 15 test pieces from the cylindrical formed shape row A, B, C (5 test pieces for each row) were placed at 25 cm interval in the direction of the length.
Test piece No.: Five (5) test pieces were taken from each row at 20 cm interval in the direction of circumference, and made No. 1–5.
Porosity: Measured in accordance with MIL-P-17549C.

TEST EXAMPLE

In the example of application 1 and example of comparison 2, FRP cylindrical formed shapes having each wall thickness of 3 mm, diameter of 2 m and length of 3 m were formed, by adjusting the feeding quantity of resin and glass fiber. Both front and rear end of these formed shapes were covered by FRP to prevent water leakage, and tap water was introduced. Then water from a service water line was introduced, and water leakage was tested for by raising water pressure. The result is shown in Table 3.

TABLE 3

| Water Pressure (kg/cm²) | Number of leakage points for the Shape prepared as was exemplary example | Number of leakage points for the Shape prepared as was example of comparison 2 |
|---|---|---|
| 0 | 0 | 0 |
| 0.1 | 0 | 0 |
| 0.2 | 0 | 0 |
| 0.3 | 0 | 1 |
| 0.4 | 0 | 3 |
| 0.5 | 0 | 24 |
| 0.6 | 0 | Many |
| 0.7 | 0 | — |
| 0.8 | 0 | — |
| 0.9 | 1 | — |

(Note)
"Leakage point" is those points where water drops or continuous water flow was observed.

EXAMPLE OF APPLICATION 2

A fiber reinforced thermosetting resin layer was first formed by a manufacturing apparatus as shown in FIG. 1, using a cylindrical die body of internal diameter of 2.8 m and 6 m long.

Glass roving SP-3 (manufactured by Asahi Fiber Glass Ltd.) was cut to a length of 50 mm and was fed to the surface of an iron die rotating at a speed of 6 rpm (peripheral speed, 53 m/min) at a rate of 4 kg/min. Liquid unsaturated polyester resin (POLYLITE FG-104, manufactured by Dainippon Ink & Chemicals Inc.) with a viscosity of 6 poise/25° C., premixed with 0.4% by weight of 6 weight % cobalt naphtenate solution (manufactured by Dainippon Ink & Chemicals Inc.) as hardening accelerator, and 55 weight % MEKPO (manufactured by Nippon Oils & Fats Co., Ltd.) as catalyzer were mixed in the line mixer at a weight ratio of 100:1.5, and fed on the glass fibers at the rate of 8 kg/min.

The fibers and mixture were pressed by the pressing rollers used in the example of application 1. In this case, 3 sets of rollers were used at a spacing of about 10 cm, and the pressure of each roller due to its own weight was about 230 g/cm.

The suspension stand D on which the feeding part of glass fiber, resin, etc., and pressing rollers were mounted was moved along the axis of the rotation of the die at the speed of 30 cm/min.

The fiber reinforced thermosetting resin layer thus obtained was 6 m long, 2.8 m in diameter, and 3 mm in thickness.

After such resin layer was formed, a mixture of glass chop and expandable resin were supplied simultaneously on the resin layer while rotating the die body in the same way as stated above. As with the glass chop, the glass roving SP-3 was cut to a length of 50 mm and fed at the rate of 2 kg/min. On the other hand, liquid unsaturated polyester resin (POLYLITE FF100, manufactured by Dainippon Ink & Chemicals Inc.) with a viscosity of 12 poise/25° C., premixed with 0.2% by weight of 6 weight % cobalt naphtenate solution (manufactured by Dainippon Ink & Chemicals Inc.) as hardening accelerator, was heated to the resin temperautre of 50° C., and sent by a pump, as a hardening agent. A separately prepared 1:1 mixture of hydrazine compound (CELLOGEN XP-100, Uniroyal Chemical Co.) and monomeric styrene was mixed with the above liquid resin at the rate of 16:100 in a line mixer. The resin mixture for foaming thus prepared was fed from the discharging port at the rate of 8 kg/min. The feeding parts for glass chop and foaming resin were moved along the die rotating shaft at the speed of 30 cm/min.

The fiber reinforced unsaturated polyester resin layer thus obtained was 6 m long, 2.8 m in diameter, and 20 mm in thickness, with the foaming magnification rate of 2.5.

Further formation of fiber reinforcing thermosetting resin layer was performed upon the above layer, and a 3 layer structure was obtained.

The cylindrical shaped product having a fiber reinforced unsaturated polyester resin layer thus obtained was 6 m long, 2.8 m in diameter, and 26 mm in thickness, with a 3 layer structure.

EXAMPLE OF APPLICATION 3

An FRP cylindrical shape product was obtained by a manufacturing apparatus as shown in FIG. 1 using cylindrical die body of internal diameter 2 m, and 6 m long.

Glass roving SP-3 (manufactured by Asahi Fiber Glass Ltd.) was cut to a length of 50 mm and was fed to the internal surface of an iron die rotating at the speed of 6 rpm (peripheral speed, 37.7 m/min) at the rate of 2 kg/min. Liquid unsaturated polyester resin (POLYLITE FG-104, manufactured by Dainippon Ink & Chemicals Inc.) at a viscosity of 5 poise/25° C., premixed with 0.4% by weight of 6 weight % cobalt naphtenate (manufactured by Dainippon Ink & Chemicals Inc.) as hardening accelerator, and 55 weight % MEKPO (manufactured by Nippon Oils & Fats Co., Ltd.) as catalyzer, were each sent by separate pumps at the rate of 100:1 through conduit tubes, and mixed via a mixing apparatus and fed on the glass fibers at the rate of 4 kg/min.

The above were pressed by the pressing rollers used in the example of application 1. In this case, 3 sets of rollers were used with a spacing of about 10 cm, and the pressure of the each roller due to its own weight was about 230 g/cm.

Then 50 glass roving SP-3 (manufactured by Asahi Fiber Glass Ltd.) fibers were sent out as a set, and were fed as a parallel winding at the rage of 4.4 kg/min (38 m/min) through the feeding out facility and from the conduct tube. Upon this, other glass roving SP-3 being cut to the length of 50 mm was fed at the rate of 2 kg/min. Then the above resin was fed at a rate of 8.5 kg/min on those fibers. Then the above were pressed by the rollers and deaerated.

The reciprocately sliding body on which the feeding part of glass fiber, resin, etc., and pressing rollers are mounted was moved along the axis of the rotation of the die at the speed of 30 cm/min.

The cylindrical form shape thus obtained was 6 m long, 2 m diameter, and 7 mm thickness. Test pieces in the axial and circumferential direction were cut out, and their strengths were measured. The result is shown in Table 4.

Obviously, numerous modifications and variations of the present invention are possible in light of the above teachings. It is therefore to be understood that within the scope of the appended claims, the invention may be practiced otherwise than as specifically described herein.

TABLE 4

| Example of Application | Direction of Load | Tensile strength (kg/mm$^2$) | Tensile Elastic Modulus (kg/mm$^2$) | Bending Strength (kg/mm$^2$) Inside Load | Bending Strength (kg/mm$^2$) Outside Load | Glass Contents % |
|---|---|---|---|---|---|---|
| Example of Application 3 | L | 7.8 | 965 | 11.5 | 10.9 | 44.8 |
| | R | 24.1 | 2200 | 40.7 | 39.9 | |

(Note) Direction of load — L: Axial direction, R: Circular direction

What is claimed as new and desired to be secured by letters patent of the United States is:

1. A fiber reinforced thermosetting resin cylindrical shaped product manufacturing apparatus comprising:
   (a) a cylindrical forming die body having a longitudinal axis and open axial ends;
   (b) first means for supporting and rotating said cylindrical forming die body about the longitudinal axis thereof at a rotational speed selected so as to cause a centrifugal force of less than two times the gravitational force at the periphery of a cylindrical product being manufactured;
   (c) a cantilever beam body positionable within said cylindrical forming die body and extending along the longitudinal axis of said cylindrical forming die body;
   (d) a suspension stand mounted on said cantilever beam body;
   (e) second means mounted on said suspension stand for feeding strands of reinforcing fiber to the inner surface of said cylindrical forming die body as said cylindrical forming die body is being rotated by said first means;
   (f) third means mounted on said suspension stand for coating the reinforcing fibers with a liquid thermosetting resin;
   (g) fourth means mounted on said suspension stand for mixing a resin hardening agent into the liquid thermosetting resin;
   (h) said second means, said third means, and said fourth means cooperating to form an unfinished, roughly cylindrical mass of reinforcing fibers coated with a liquid thermosetting resin mixed with a resin hardening agent on the inner surface of said cylindrical forming die body;
   (i) a plurality of axially spaced, freely rotatable pressing rollers mounted on said suspension stand and sized, shaped, and positioned so as to bear against the inner surface of the roughly cylindrical masses produced by said second, third, and fourth means so as to complete the shaping of the inner surface of each cylindrical shaped product, each one of said plurality of axially spaced, freely rotatable pressing rollers being rotatably mounted on the distal end of a rocking lever which is pivotably mounted on said suspension stand; and
   (j) fifth means for selectively, controllably, and independently adjusting the amount by which each one of said rocking levers is pivoted, whereby the position of the associated one of said plurality of axially spaced, freely rotatable pressing rollers can be selectively and controllably adjusted;
   (k) each one of said plurality of axially spaced, freely rotatable pressing rollers being pivotably supported in a bearing body which, in turn, is freely pivotable on the distal end of the associated one of said rocking levers, whereby:
(i) each one of said plurality of axially spaced freely rotatable pressing rollers pivots freely relative to the distal end of the associated one of said rocking levers and
(ii) only the weight of each one of said plurality of axially spaced, freely rotatable pressing rollers and its associated bearing body bears against the inner surface of the roughly cylindrical masses produced by said second, third, and fourth means.

2. Manufacturing apparatus of claim 1 wherein said first means is adapted to cause said cylindrical forming die body to rotate at a circumferential speed of 0.5–200 m/min.

3. Manufacturing apparatus of claim 1, in which said cylindrical forming die body is fixed in the direction of said longitudinal axis, and said suspension stand is constructed so as to reciprocate on said cantilever beam body.

4. Manufacturing apparatus of claim 2, in which said cylindrical forming die body is mounted so as to reciprocate in the direction of said longitudinal axis, and said suspension stand is fixed on said cantilever beam body.

5. Manufacturing apparatus of claim 1, in which said second means comprises at least one of a chopped strands reinforceing material feeding part and a strands reinforcing material feeding part.

6. Manufacturing apparatus of the claim 1, in which said pressing rollers have axes parallel to said longitudinal axis of said cylindrical forming die body.

7. Manufacturing apparatus of claim 1, in which said pressing rollers are loaded to 20–600 g/cm.

8. Manufacturing apparatus of claim 1, in which said pressing rollers have concave and convex surfaces.

9. Manufacturing apparatus of claim 3, in which said suspension stand moves on said cantilever beam body as the formation of a cylindrical shaped product proceeds.

10. Manufacturing apparatus of the claim 4, in which said cylindrical forming die body moves in the direction of longitudinal axis as the formation of a cylindrical shaped product proceeds.

11. Manufacturing apparatus of claim 1, in which said fourth means mixes the resin hardening agent into the liquid thermosetting resin before said third means coats the liquid thermosetting resin on the reinforcing fibers.

* * * * *